3,013,000
POLYMERIZATION OF CHLOROPRENE STABILIZED WITH PHENTHIAZINE
Anton Robert Heinz and Dietrich Rosahl, Leverkusen, and Wilhelm Graulich, Koln-Stammheim, Germany, assignors to Farbenfabriken Bayer Aktiengesellschaft, Leverkusen, Germany, a corporation of Germany
No Drawing. Filed Mar. 19, 1959, Ser. No. 800,405
Claims priority, application Germany Apr. 10, 1958
3 Claims. (Cl. 260—87.5)

It is usual to protect monomeric chloroprene-(2-chlorobutadiene-1:3) against uncontrolled and premature polymerization by adding anti-oxidizing agents, such for example as phenthiazine.

It is desirable to leave this stabilizer in the monomer during polymerization, because considerable advantages are thus provided. In the first place, this obviates the necessity of previously separating the stabilizer by distillation of the chloroprene and also the necessities of storing the resulting unstabilized chloroprene at very low temperature and further, of protecting it against access of air. A second advantage is that the polymers obtained from the stabilized chloroprene have favourable properties.

It is also known that olefinically unsaturated componds, such for example as butadiene or styrene, can be emulsion polymerized with the aid of sulphinic acids, such for example as mepasin-sulphinic acid, in the acid pH-range, if at the same time small amounts of molecular oxygen are added.

Sulphinic acids such as ethyl-sulphinic acid and mepasin-sulphinic acid can also be used as activators when polymerizing pure chloroprene, provided the operation takes place in the acid pH-range and sufficient oxygen is present; the polymerization does not, however, take place in the presence of phenthiazine. In the alaline pH-range, there is no polymerization of the pure or stabilized chloroprene with the said activators. Moreover, the sulphinic acids, for example benzene sulphinic acid, o- and p-toluene and o-chlorobenzene sulphinic acids, mentioned in U.S. patent specification Nos. 2,227,519, 2,227,517, 2,402,819 and 2,568,803 and also in British patent specification No. 687,299 do not cause polymerization of chloroprene in alkaline emulsions.

It has now been found that chloroprene, which is stabilized by adding phenthiazine, can be polymerized in alkaline emulsion at temperatures from about 0° C. upwards if formamidine-sulphinic acid is used as a catalyst. In this case, the pH-value of the polymerization mixtures can fluctuate within wide limits, but pH-values of from 7 to 12 have proved to be particularly suitable.

The polymerization of chloroprene is carried out in an aqueous emulsion, advantageously in the presence of known emulsifiers and regulators in quantities of for example, 100 parts by weight of chloroprene for every 80 to 250 parts by weight of water. The quantity of formamidine-sulphinic acid is generally in the range of 0.02 to 2 percent by weight, that of the emulsifiers is about 1 to 10 percent by weight, and that of phenthiazine is about from 0.01 to 2 percent by weight calculated on the monomer being used. As regulators or modifiers there come into question higher alkyl mercaptans having 10 to 20 carbon atoms, such as dodecylmercaptan, octadecylmercaptan, iodoform, dialkyl xanthogenedisulfides, such as diisopropyl xanthogenedisulfides. These modifiers are applied in quantities of about 0.05–7 percent by weight as calculated on the monomers.

Polymerization occurs at a temperature of about 0° to 35° C., but can also be carried out at higher temperatures up to about 80° C., temperatures of 0° to 70° C. being preferred. After reaching a yield of 60–90 percent, the reaction is generally terminated by cooling the reaction mixture to room temperature and/or degasing. The process is also suitable for the production of copolymers from chloroprene and other olefinically unsaturated compounds, such as 2,3-dichlorobutadiene, which latter monomers are preferably applied in quantities of 0.1–20 percent by weight as calculated on the weight of the total monomers.

In the following examples, the parts indicated are parts by weight.

*Example 1*

100 parts of chloroprene, which are stabilized with 0.1 part of phenthiazine, and 0.4 part of n-dodecyl mercaptan are emulsified with a solution which consists of 4 parts of the sodium salt of disproportionated abietic acid, 0.8 part of the sodium salts of methylene dinaphthyl disulphonic acid and 0.5 part of sodium hydroxide in 150 parts of water. The mixture is brought to the reaction temperature of 40° C., the air is displaced by introducing nitrogen and an aqueous solution of 0.35 part of formamidine-sulphinic acid is added. The reaction starts immediately and is terminated by cooling when the yield is 75 percent after a period of about two hours.

*Example 2*

The procedure set out in Example 1 is followed, with the difference that the reaction temperature is 50° C. and 0.15 part of formamidine-sulphinic acid is used as catalyst. A yield of 60 percent is reached after three hours, whereafter cooling and degasing is carried out.

*Example 3*

100 parts of chloroprene, which are stabilized with 0.3 part of phenthiazine, are emulsified as in Example 1 and polymerized at 65° C. 0.1 part of formamidine-sulphinic acid is used as catalyst. The polymerization is terminated by cooling to room temperature when the yield has reached 70 percent, and the latex is freed in vacuo from the residual chloroprene.

*Example 4*

100 parts of chloroprene which are stabilized with 0.1 part of phenthiazine are emulsified with a solution of 150 parts of water and 4 parts of an emulsifier, which has been obtained by treatment of a benzene fraction having the boiling points from 230–320° C. with $SO_2$ and $Cl_2$ and subsequent alkali saponification and brought to 55° C. With the addition of 0.4 part of the corresponding sulphinate, no polymerization took place after 6 hours in the presence of 2 parts of normal sulphuric acid.

*Example 5*

100 parts of chloroprene, which are stabilized with 0.1 part of phenthiazine, are emulsified in an alkaline medium as in Example 1 and heated to 40° C. On adding 0.5 part of the sulphinate used in Example 4, no polymerization takes place.

*Example 6*

100 parts of pure chloroprene are emulsified in an alkaline medium as in Example 1 and heated to 40° C. On addition of 0.5 part of benzene sulphinic acid, no polymerization is observed.

*Example 7*

100 parts of chloroprene stablized with 0.05 part of phenthiazine and 0.25 part of n-dodecyl mercaptan are emulsified with a solution consisting of 4 parts of the sodium salt of the disproportionated abietic acid, 0.7 part of the sodium salt of methylene-dinaphthyl-disulfonic acid and 0.9 part of caustic soda in 160 parts of water. The mixture is emulsified and brought to a reaction temperature of 0° to 10° C. After addition of 0.4 to 0.30 part of formamidine-sulphinic acid which has been dissolved in water, polymerization occurs. The yield after 6 to 10 hours reaches 75 percent, whereafter the reaction is finished by degasing.

What we claim is:

1. A process for the polymerization of chloroprene which comprises contacting a mixture of a major amount of chloroprene and a minor amount of a halogenated diolefin in the presence of phenthiazine in an aqueous emulsion with 0.02–2% by weight, calculated on the chloroprene, of formamidine sulfinic acid at a pH value of 7–12 and at a temperature of about 0°–80° C., thereby causing the chloroprene to polymerize.

2. A process for the polymerization of chloroprene which comprises contacting a monomer mixture containing at least 80% by weight of chloroprene in the presence of phenthiazine in an aqueous medium with 0.02–2% by weight, calculated on the chloroprene, of formamidine sulfuric acid at a pH value of 7–12 and at a temperature of about 0°–80° C., thereby causing the chloroprene to polymerize 3. A process which comprises contacting chloroprene and 0.1 to 20 percent by weight of 2.3-dichlorobutadiene, said percentage being based on the total amount of monomers, and 0.02 to 2 percent by weight, calculated on the monomers, of formamidine sulfinic acid, at a pH value of 7 to 12 and at a temperature of about 0 to 80° C., thereby causing said monomers to copolymerize, said copolymerization being conducted in an aqueous emulsion in the presence of phenthiazine.

References Cited in the file of this patent

UNITED STATES PATENTS

| | | |
|---|---|---|
| 2,227,519 | Starkweather et al. | Jan. 7, 1941 |
| 2,745,813 | Logemann et al. | May 15, 1956 |